United States Patent [19]

Marchionni et al.

[11] Patent Number: 5,104,911
[45] Date of Patent: Apr. 14, 1992

[54] CROSS-LINKED PRODUCTS WITH THE STRUCTURE OF PERFLUOROPOLYETHERS HAVING FUNCTIONAL GROUPS

[75] Inventors: Giuseppe Marchionni, Milan; Ezio Strepparola, Treviglio; Gianfranco Spataro, Lissone, all of Italy

[73] Assignee: Ausimont S.r.l., Milan, Italy

[21] Appl. No.: 335,552

[22] Filed: Apr. 10, 1989

[30] Foreign Application Priority Data

Apr. 11, 1988 [IT] Italy ................. 20157 A/88

[51] Int. Cl.$^5$ .............. C08G 65/00; C08G 59/34
[52] U.S. Cl. .............. 522/187; 522/156; 528/361; 528/392; 204/156; 204/157.92
[58] Field of Search .......... 528/361, 392; 522/156, 522/187; 204/157.92, 156

[56] References Cited

U.S. PATENT DOCUMENTS 3,849,504 11/1974 Mitsch .................. 204/157.92

FOREIGN PATENT DOCUMENTS 0244839 11/1987 European Pat. Off.

Primary Examiner—Marion E. McCamish
Assistant Examiner—S. Rosasco
Attorney, Agent, or Firm—Stevens, Davis, Miller & Mosher

[57] ABSTRACT

Cross-linked macromolecular products having the structure of perfluoropolyethers in which the cross-linking is due to C—C links between carbon atoms of different perfluoropolyether chains, said cross-linked products being obtained by treatment by means of U.V. radiations of the corresponding perfluoropolyethers containing at least three groups:

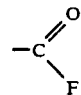

arranged along the chain and at one or at both ends; the C—C link of cross-linking coming from the removal of two groups:

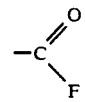

of different perfluoropolyether chains.

3 Claims, No Drawings

CROSS-LINKED PRODUCTS WITH THE STRUCTURE OF PERFLUOROPOLYETHERS HAVING FUNCTIONAL GROUPS

DESCRIPTION OF THE INVENTION

The present invention relates to cross-linked macromolecular products having the structure of perfluoropolyethers, in which the cross-linking is due to direct C—C links between carbon atoms of different perfluoropolyether chains, such cross-linked products furthermore being provided with functional groups arranged along said chains and at their ends.

The functional groups in question are the groups:

as well as all those groups which can be obtained from the same by means of known chemical reactions, such as: —COOH, —CONHR (R=H or an alkyl group), —CN, —CHR'OH (wherein R'=H or $CF_3$), —$CH_2NH_2$, —$SO_3H$.

Additional functional groups may be obtained from the above-mentioned functional groups, for instance those described in U.S. Pat. Nos. 3,810,874 and 3,847,978, and European patents Nos. 165,649 and 165,650.

The cross-linked products of this invention are obtained by subjecting to the action of radiations having sufficient energy, such as U.V., electron beam radiations and the like, perfluoropolyethers having the groups:

along the chain as well as at one or at both ends.

Such —COF groups are removed under the action of the radiations, giving rise to the formation of a —C—C— link between carbon atoms of different chains, every two —COF groups of which have been removed. The latter are turned into volatile by-products (CO+$COF_2$).

The starting perfluoropolyethers containing the groups:

have a structure corresponding to one of the following formulas:

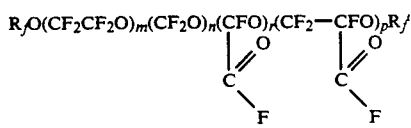

(I)

wherein $R_f$ and $R'_f$, which may be the same or different, are:

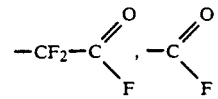

wherein each of indexes m and p has the value of at least 1, the total number of COF groups in the molecule being at least 3, r is p and may be 0, and moreover m/n ranges from 0.5 to 2, the molecular weight ranging from 800 to 15,000; or

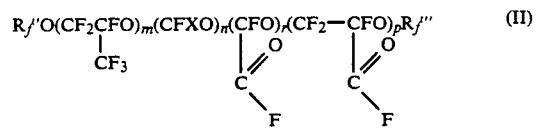

wherein: $X=F$ or $CF_3$, $R''_f$ or $R'''_f$, which may be the same or different, may be perifluoroalkyl groups having from 1 to 3 carbon atoms; or

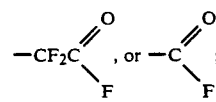

wherein the m/n ratio ranges from 5 to 40 $p \geq 1$ on condition that the molecule contains at least 3

groups, r is $\leq p$ and may be 0, the molecular weight ranging from 800 to 8,000.

By applying the technology described in European patent application No. 244,839 to a starting mixture, consisting of $C_2F_4$, $C_3F_6$ and hexafluorobutadiene, and by using the same operating conditions in the photochemical oxidation, in the decomposition of the peroxidic groups, and in the conversion of epoxy groups into COF groups, a product is obtained containing, in admixture, the different perfluorooxyalkylene units of the aforesaid formulas I and II and which may be represented by the following general formula:

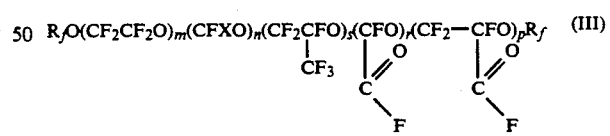

(III)

wherein the $R_f$ end groups have the same meaning as set forth above for formula (II), as to the indexes n, p and r these have the meanings as in formula (II), whereas to (m+s) the same indications apply concerning m as in formula (II).

In the aforesaid formulas the perfluoroxyalkylene units are arranged, with a random distribution, along the perfluoropolyether chain.

The above-mentioned starting perfluoropolyethers are prepared by following the methods indicated in European patent No. 244,839. In such patent, the preparation is disclosed in particular of the corresponding perfluoropolyethers containing epoxy groups

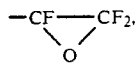

along the perfluoropolyether chain and the conversion of the same epoxy groups into

groups by thermal treatment a 180°–200° C.

A simplified method consists in subjecting directly to thermal treatment at 180°–200° C. the product of the photooxidation thereby achieving, at the same time, decomposition of the peroxide groups and conversion of the epoxy groups into

groups.

Some information, in this connection, is given in U.S. Pat. No. 3,451,907.

The cross-linking is carried out by subjecting the perfluoropolyether mixture to the action of radiations having high energy such as U.V., electron beam radiations and the like.

The cross-linking may be regulated easily by varying the intensity, time required for the irradiation, and the oil concentration.

Consequently a more or less large part of the —COF groups present is removed to form cross-links. Therefore the obtained cross-linked product may have a more or less high degree of cross-linking and possess a more or less large number of —COF groups, which are not utilized in the cross-linking process and which may be converted into different functional groups by means of per se known reactions.

According to the technology described in the aforesaid European patent No. 244,839 the starting products may be obtained at a controlled molecular weight, with values ranging over wide limits and with a number of epoxy groups along the chain, which are variable at will.

Therefore by carrying out a controlled cross-linking according to the present invention, a wide range of products may be obtained having a degree of cross-linking variable at will, containing residual functional —COF groups in a predetermined number.

Whereas the starting perfluoropolyethers are liquid products having a more or less high viscosity, depending on their molecular weight, soluble in chlorofluorocarbon solvents, the macromolecular products according to the present invention, having a certain degree of cross-linking, are products having a waxy aspect, insoluble in solvents, non-moldable, and only susceptible of swelling in solvents depending on their degree of cross-linking.

The products having a low degree of cross-linking are susceptible of swelling in solvents.

The products according to the invention, on account of their perfluoropolyether structure, show a very low Tg of the order of −100° to −120° C.

The cross-linked products according to the present invention may be obtained with a high content in functional —COOH groups and in this case they may act very suitably as ion exchange resins for fixing metal cations. They may further be provided with basic functional groups whereupon they then act as anion-exchange resins.

On account of their high chemical inertness, the products according to the present invention may be used particularly as catalyst carriers containing, as the active catalytic part, particular functional groups (for instance acid groups) or metal cations fixed by ion exchange.

Their employment in the form of a membrane for ion exchange, in electrolytic processes, is of particular interest.

This invention may be also utilized for producing polymeric coatings on metals and/or on other polymeric, ceramic materials, and the like. Because of specific functional groups that are present, high adhesion to the substrate may be achieved. The coating may be carried out in a simple way, such as by applying the starting liquid perfluoropolyether product to the substrate and then subjecting same to radiations in order to obtain a cross-linking, to which corresponding chemical changes on the functional groups follow.

The following examples will be given by way of illustration but not of limitation of the invention.

EXAMPLE 1

Use was made of a 300 ml photochemical reactor having an optical path of 0.5 cm, equipped with a reflux cooler kept at −80° C. and a sheath with thermocouple for measuring the temperature. The reactor was equipped with a system of quartz sheaths cooled by means of FC 75 ®for the connection of the U.V. lamp (HANAU TYPE TW 150) (wave length ranging from 248 to 800 nm).

200 ml of $CF_2Cl_2$ were loaded into the reactor, after having been cooled by means of a dry ice and acetone bath; then, 20 l/h of $O_2$, 3.5 l/h of $C_2F_4$ and $C_4F_6$ were fed during 4.3 hours, while keeping the reactor at −40° C. The inlet gases were passed through a $CaCl_2$ trap. At the end the solvent was evaporated and 96 g of an oil were obtained.

The oil thus produced turned out to have a composition in active (peroxidic) oxygen of 1.8% by weight.

On the basis of these data and NMR $^{19}F$ and IR spectra, the structure of this product may be represented by a succession of units —$CF_2O$—, —$CF_2CF_2O$, $CF_2O$—O, $CF_2CF_2O$—O,

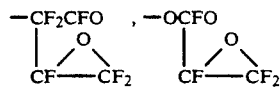

The product having a viscosity of 165 cSt at 20° C. had a molecular weight (determined by GPC and confirmed by NMR) of 1810. The epoxy content was 4.7 units per polymeric chain.

EXAMPLE 2

The oil having a peroxidic power (P.O.) equal to 1.8% by weight, obtained in Example 1, was subjected to a thermal treatment in order to reduce the oxidizing power.

96 g of polymer were placed into a 100 ml flask equipped with a thermometer and a stirrer. The temperature was brought to 200° C., during 3.5 hours and kept at this value for a further 2 hours. At the end 70.2 g of a product were discharged which, upon idiometric analysis, turned out to have a P.O. of no value. The $^{19}$F spectrum did not show the presence of epoxy groups; however, peaks appeared, which were characteristic of the groups:

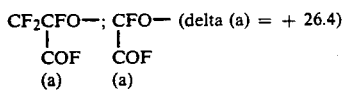

The product turned out to have a molecular weight of 1290. Upon acidimetric analysis it turned out to have an equivalent weight, relating to the number of COF groups, of 259.

EXAMPLE 3

Use was made of a 100 ml photochemical reactor having an optical path of 0.2 cm, equipped with a reflux cooler kept at −80° C. and a sheath with a thermocouple for measuring the temperature. The reactor was equipped with a system of quartz sheaths cooled by means of FC 75 ®for the connection of the U.V. lamp type HANAU TQ 150, emitting with wave lengths ranging from 248 to 800 nm.

1.4 g of the product obtained as described in Example 2 and 60 g of perfluoroheptane were loaded into the reactor. Then the reactor was cooled to −40° C. and the reaction mass was irradiated for a total time of 2.5 hours. A progressive turbidity of the reaction mass was noted. At the end the lamp was switched off, the solvent was evaporated, and 1.2 g of a product were recovered having a waxy, white colored aspect, which was able to swell only in fluorochlorinated solvents and, after hydrolysis, swelled in water and acetone.

I.R. analysis still showed the presence of —COF bands (1884 cm$^{-1}$). The acidimetric titre allowed one to calculate equivalent weight, relating to the number of —COF groups, of 558. The product turned out to have a Tg of −115° C.

EXAMPLE 4

Use was made of the same photochemical plant as described in Example 1, while operating with a 600 ml reactor having an optical path of 1 cm, under conditions of 400 ml of CF$_2$Cl$_2$, 46.6 l/h of O$_2$, 7.5 l/h of C$_2$F$_4$, and 2.8 l/h of C$_4$F$_6$, at a temperature of −40° C. for a total time of 5 hours.

When the reaction was over the solvent was evaporated and 200 g of an oil were recovered. The oil thus produced turned out to have a composition in peroxide oxygen equal to 3.2% by weight. On the basis of the NMR $^{19}$F data the structure of this product proved to be represented by a succession of units —CF$_2$O—, —CF$_2$CF$_2$O—, CF$_2$—O—, CF$_2$CF$_2$O—O,

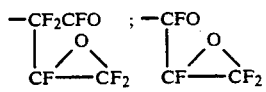

with end groups of the type: OCOF (90%), CF$_2$COF (10%).

The product turned out to have a viscosity of 200 cSt at 20° C. and a molecular weight of 5000, determined by means of vapor pression osmometer (V.P.O.).

The content in epoxy groups was 10.8 groups per polymeric chain. The acidimetric analysis allowed one to calculate an equivalent weight, relating to the number of COF groups, of 1000, the number of peroxides per chain being 10.

EXAMPLE 5

The product obtained in Example 4, having a P.O.=3.2%, was subjected to thermal treatment.

200 g of the polymer were placed into a 250 cc flask equipped with a thermometer and a stirrer. The temperature was brought to 220° C. during 8 hours and kept at this value of 220° C. for a further 4 hours. At the end 132 g of a product were discharged, which upon idiometric analysis turned out to have a PO of no value. The NMR $^{19}$F spectrum showed a structure of the type:

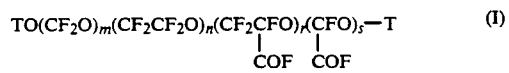

with T=CF$_2$COF having a molecular weight of 1750 calculated by means of V.P.O. The acidimetric analysis allowed one to calculate an equivalent weight, referred to COF, of 260, and therefore with 6.7 —COF groups per polymeric chain. In the above formula v+s=4.7.

Moreover from NMR one inferred that v/r+s=0.9 and m/n=0.8, and therefore general formula (I) turned out to have the following indexes: m=5.54, n=6.92, r=4.23, and s=0.47.

EXAMPLE 6

Use was made of a 300 ml reactor for petrochemistry having an optical path of 0.5 cm, equipped with a reflux cooler kept at −80° C. and a sheath with thermocouple for measuring the temperature. The reactor was equipped with quartz sheaths cooled by means of Galden D02 ® for the connection of the U.V. lamp, type HANAU TQ 150, emitting with wave lengths ranging from 200 to 800 nm.

56 g of the product from Example 5 and 250 ml of Galden D80 ® were loaded into the reactor. The sheath containing the lamp was cooled so that the reactor temperature was kept at about 20° C. and the reaction mass was irradiated for a total time of 8 hours.

At the end of that time the lamp was switched off, the solvent (Galden D80 ®) was evaporated and 53.2 g of a product were recovered, which appeared very viscous and after hydrolysis was soluble in water. The acidimetric titration allowed one to calculate an equivalent weight, referred to the number of —COF groups, of 277; therefore it turned out that only 6% of end groups —COF had been converted. On the basis of these data one inferred that the structure was of the type:

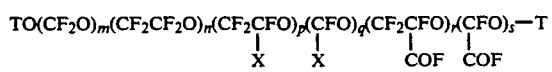

wherein X represented an interchain link and end groups T were —CF$_2$COF. Consequently the indexes m, n, p, q, r, s turned out to be: m=5.54, n=6.92, r=3.66, s=0.4, p=0.23, and q =0.03, respectively.

EXAMPLE 7

A second test was carried out according to the same procedures described in Example 6, but with an oil concentration of 2.5 g/l with respect to the solvent that had been used.

After a reaction time of 4 hours, 6.65 g of a product were recovered, having a waxy, white aspect, which product was only able to swell in fluorochlorinated solvents; after hydrolysis it was only able to swell in water and acetone. The acidimetric titration allowed one to calculate an equivalent weight, with respect to the number of COF groups, of 850. From this, it turned out that 25% of the end groups had reacted.

In this case one inferred that the polymeric structure was of the following type:

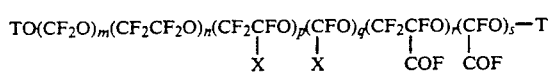

wherein X represented an interchain link and T an end group $CF_2COF$. Consequently the indexes turned out to be: m=5.54, n=6.92, r=2.7, s=0.3, p=1.5, and q=0.2.

EXAMPLE 8

99 g of perfluoro-1,3-butadiene and 297 g of hexafluoropropene with a continuous feed of $O_2$ for a total of 35.2 g of oxygen, were reacted at $-40°$ C. during 3 hours and 45 minutes in a 0.25 l glass reactor equipped with a U.V. lamp (high pressure mercury-vapor lamp, type TQ 150 HANAU), with pipes for introducing the gaseous reagents and for drawing the samples.

After degassing at room temperature under vacuum, an oil was obtained in the reactor having a viscosity of 800 cSt at 20° C. and a content of peroxidic groups equal to 0.9% by weight of active oxygen (according to the idiometric analysis). Obtained product: 195 g.

The average molecular weight determined by V.P.O. was 3310. The acidimetric analysis gave an equivalent weight, referred to the number of COF groups, equal to 1000. The number of epoxy groups turned out to be, on the average, 3.8 per molecule.

Therefore the macromolecular structure of the product consisted of the following formula:

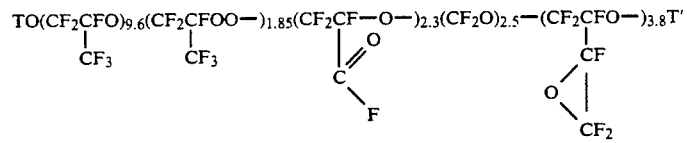

with $T=CF_3$ and $T' = CF_2COF$.

By thermal treatment at 200°-250° C. during 8 hours, one obtained a complex conversion of the epoxy groups into

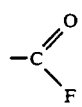

The product thus-obtained had a molecular weight of 2416 and an equivalent weight, with respect to COF, of 443 corresponding to an average of 5.45 groups

per molecule.

1.7 g of the product after thermal treatment and 65 ml of perfluoroheptane were introduced into a 100 ml reactor for photochemistry, having an optical path of 0.2 cm, equipped with a cooler, as it is described above in Example 3. The reactor was cooled to $-40°$ C. and the reaction zone was irradiated for a total time of 2.5 hours.

The lamp was switched off. A slurry was discharged, which, after evaporation of the solvent under vacuum, left a product having a waxy, white aspect.

The tests concerning the solubility turned out to be negative for the products as such in chlorofluorocarbon solvents. The product after hydrolytic treatment in water was able to swell only slightly in water and in acetone, as well as its sodium, ammonium and potassium salts.

Upon the I.R. spectroscopic examination the product presented functional groups for —COF. The acidimetric titration showed an equivalent weight, referred to the numbers of —COF group, of 1015 with the disappearance of —COF groups equal to 56%.

EXAMPLE 9

A polymer obtained by operating according to Example 7 was hydrolyzed with water at 60° C., filtered and dried at room temperature. Said polymer, upon potentiometric titration, had an equivalent weight of 740. 57.6 mg of the thus-obtained polymer was stored for a night at room temperature in 15 ml of 0.5 molar NaCl water solution until equilibrium was achieved.

The swollen solid was then separated by filtration on a Nucleopore filter (0.22 μ size pores) and the liquid phase, containing the hydrogen ions originating from the —COOH groups after exchange with $Na^+$ ions, was added with 6.52 ml of a $10^{-2}$ molar NaOH water solution. The excess of $OH^-$ ions were then titrated with a $10^{-2}$ molar aqueous $HNO_3$ solution.

The ion-exchange efficiency of the polymer (namely, the NaCl percent withdrawn from the solution) turned out to be 66%.

The ion-exchange efficiency of NAFION (a sulphonic ion-exchange membrane manufactured by DuPont, having an equivalent weight of 1,100) under the same exchange conditions turns out to be 73%.

EXAMPLE 10

A polymer prepared as described in Example 6 was hydrolyzed with water at 60° C., filtered and dried at room temperature. The polymer had an equivalent weight of 350. 88.1 mg of the thus-obtained polymer was treated with 20 ml of the same NaCl solution as in Example 9, under the same conditions.

After filtration, the liquid phase containing the hydrogen ions was titrated with 0.1 molar KOH water solution.

The efficiency of the polymer turned out to be 52%. The atomic absorption spectroscopy of the polymer confirmed said value.

EXAMPLE 11

69.4 mg of the same hydrolyzed polymer as used in Example 9, was treated with 15 ml of a 0.5 molar KCl water solution under the same conditions described in said example.

The ion-exchange efficiency of the polymer turned out to be 68%.

The efficiency of NAFION, in this case, turned out to be 75%.

EXAMPLE 12

0.5 g of the hydrolyzed polymer of Example 9 was put into a solution of 0.3 g of the amine having the formula:

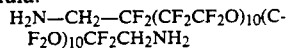
H$_2$N—CH$_2$—CF$_2$(CF$_2$CF$_2$O)$_{10}$(CF$_2$O)$_{10}$CF$_2$CH$_2$NH$_2$ in 10 ml of 1,1,2-trichloro-1,2,2-trifluoroethane.

After two hours stirring no amine was found in the solution.

The polymer was separated and dried. At the F.T.I.R. analysis it showed the typical absorption band of —COO$^-$ at 1672 cm$^{-1}$, along with the absorption band of the free acid groups at 1778 cm$^{-1}$.

What is claimed is:

1. Cross-lined macromolecular products having the structure of perfluoropolyethers, in which the cross-linking is due to direct C—C links between carbon atoms of different perfluoropolyether chains, which cross-linked products are provided with functional groups arranged along the perfluoropolyether chains and at one or both ends of said chains, said cross-linked products being obtained by treatment, by means of U.V. radiation, of perfluoropolyethers containing at least 3

groups arranged along the perfluoropolyether chain and at one or both ends of said chain and selected from the group consisting of

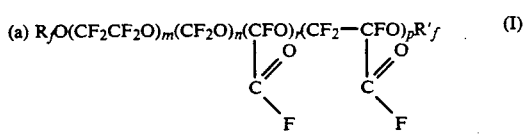

wherein R$_f$ and R$_4'$, which maybe the same or different, and are

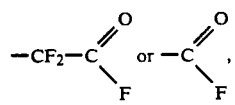

each of m and p has a value of at least 1, wherein m≧p, the total number of COF groups in the molecule is at least 3, r≦p and maybe 0, and m/n ranges from 0.5 to 2, the molecular weight ranging from 800 to 15,000;

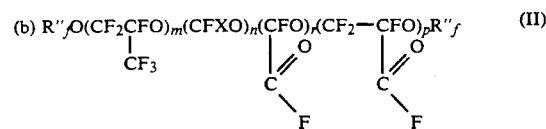

wherein X is F or CF$_3$, R''$_f$ and R'''$_f$, which may be the same or different, are perfluoroalkyl groups having from 1 to 3 carbon atoms,

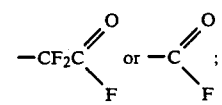

m/n ratio granges from 5 to 40, p≧1, r≦p and may be 0, the molecular weight ranging from 800 to 8000; and

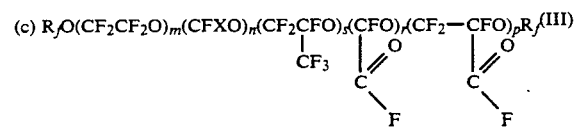

wherein R$_f$, n, p, r are defined as above and (m+s) has the same meaning as m in formula (II) above.

2. Products according to claim 1, wherein the functional groups are selected from:

—CN, —CN$_2$NH$_2$, —COOH, —CONHR, wherein R is H or an alkyl group or —CHR'OH wherein R' is H or CH$_3$.

3. A process for obtaining the products of claim 1, comprising:
 (a) photooxidizing mixtures of perfluorobutadiene with tetrafluoroethylene and/or perfluoropropene;
 (b) thermally treating the product of the photooxidation of (a) in order to remove the peroxidic groups and to convert the epoxy groups

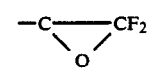

into COF groups; and
 (c) treating by means of U.V. rays the product obtained in (b) above, thereby obtaining the partial removal of

groups, with the formation of a C—C link between carbon atoms of different chains.

* * * * *